United States Patent [19]

Wilson, Sr.

[11] 4,118,769
[45] Oct. 3, 1978

[54] FULL WAVE DEMAND CONTROLLED PREREGULATING SUPPLY

[75] Inventor: Denney Lee Wilson, Sr., Georgetown, Del.

[73] Assignee: NCR Corporation, Dayton, Ohio

[21] Appl. No.: 808,213

[22] Filed: Jun. 20, 1977

[51] Int. Cl.² ............................................ H02M 7/155
[52] U.S. Cl. ........................................ 363/54; 363/88; 363/128
[58] Field of Search .................. 363/54, 85, 88, 128

[56] References Cited

U.S. PATENT DOCUMENTS

| | | | |
|---|---|---|---|
| 3,300,704 | 1/1967 | McMillen | 363/88 X |
| 3,504,269 | 3/1970 | Hallahan, Jr. | 363/88 |
| 3,636,434 | 1/1972 | Beuk et al. | 363/128 X |
| 3,670,226 | 6/1972 | Mazza | 363/88 X |
| 3,908,159 | 9/1975 | Grissey | 363/54 |

Primary Examiner—William M. Shoop
Attorney, Agent, or Firm—J. T. Cavender; Albert L. Sessler, Jr.; Elmer Wargo

[57] ABSTRACT

A circuit comprising first and second rectifiers for supplying rectified current or voltage to a storage capacitor located at the output of the circuit. The circuit includes a control circuit operatively coupled between the output and the silicon controlled rectifiers to insure that alternate ones of the silicon controlled rectifiers will supply the rectified current or voltage to the storage capacitor as needed.

11 Claims, 2 Drawing Figures

FULL WAVE DEMAND CONTROLLED PREREGULATING SUPPLY

BACKGROUND OF THE INVENTION

This invention relates to full-wave, demand-controlled, pre-regulating power supply circuits in general, and in particular to such a circuit which includes a pair of gated rectifier means and a control means for insuring that alternate ones of said gated rectifier means will supply rectified current or voltage to the output of the circuit.

In general, power supply systems designed for use in point-of-sale terminals, such as electronic cash registers for example, typically used a traditional half or full-wave bridge rectifier circuit driving a storage/regulator type system. While this system has worked well and is still widely used, it has severe disadvantages in terms of cost, heat dissipation problems, size of components required, and efficiency as a result of load current variations.

Because of the demand characteristics of certain loads, it is possible that a particular load will draw current at a frequency which corresponds to the charging frequency of one of the silicon controlled rectifiers in a conventional full wave rectifier circuit. When this occurs, it is possible that the entire rectification load will fall upon one of the two silicon controlled rectifiers in the circuit, causing it to overheat or become damaged. The present invention obviates this problem to insuring that alternate ones of the gated rectifier means such as silicon controlled rectifiers, and the like, are used to supply the rectified current as needed. Also, because the load is positively distributed between the two gated rectifier means, a lower-rated transformer may be used with this invention, as excessive loading on one of the two secondary windings of the transformer is obviated.

Another feature of this invention is that when the load demand is reduced, or when the rectified voltage at the output of circuit is above a predetermined level, both gated rectifier means will be turned off, thereby minimizing heat dissipation within the circuit.

Some representative prior art power supply circuits are found in the following U.S. Pat. Nos.: 3,781,632; 3,939,394; 3,959,716; 3,969,665; 3,987,354; and 3,987,356.

None of these patents shows the use of a control circuitry for balancing the rectification load between two gated rectifier means in a full wave power supply circuit so as to permit the use of a smaller or lower rated power transformer and smaller heat sinks in the circuit, thereby lowering its cost.

SUMMARY OF THE INVENTION

This invention relates to a circuit comprising an input means, output means, first and second rectifier means operatively coupled between the input means and the output means for supplying a rectified current or voltage to the output means, and control means operatively coupled between the output means and the first and second rectifier means for insuring that the first and second rectifier means will alternately supply the rectified current or voltage to the output means.

In the preferred embodiment, the control means includes means for sensing the rectified voltage at the output means, switch means including a flip flop means operatively coupled to the sensing means and the first and second rectifier means whereby each time the rectified voltage rises above a predetermined level as a result of one of the first and second rectifier means supplying the rectified voltage to the output means, the flip flop means will change state to condition the remaining one of the first and second rectifier means to supply the rectified voltage to the output means when the rectified voltage at the output means drops below the predetermined level.

DETAILED DESCRIPTION OF THE INVENTION

Figure 1:
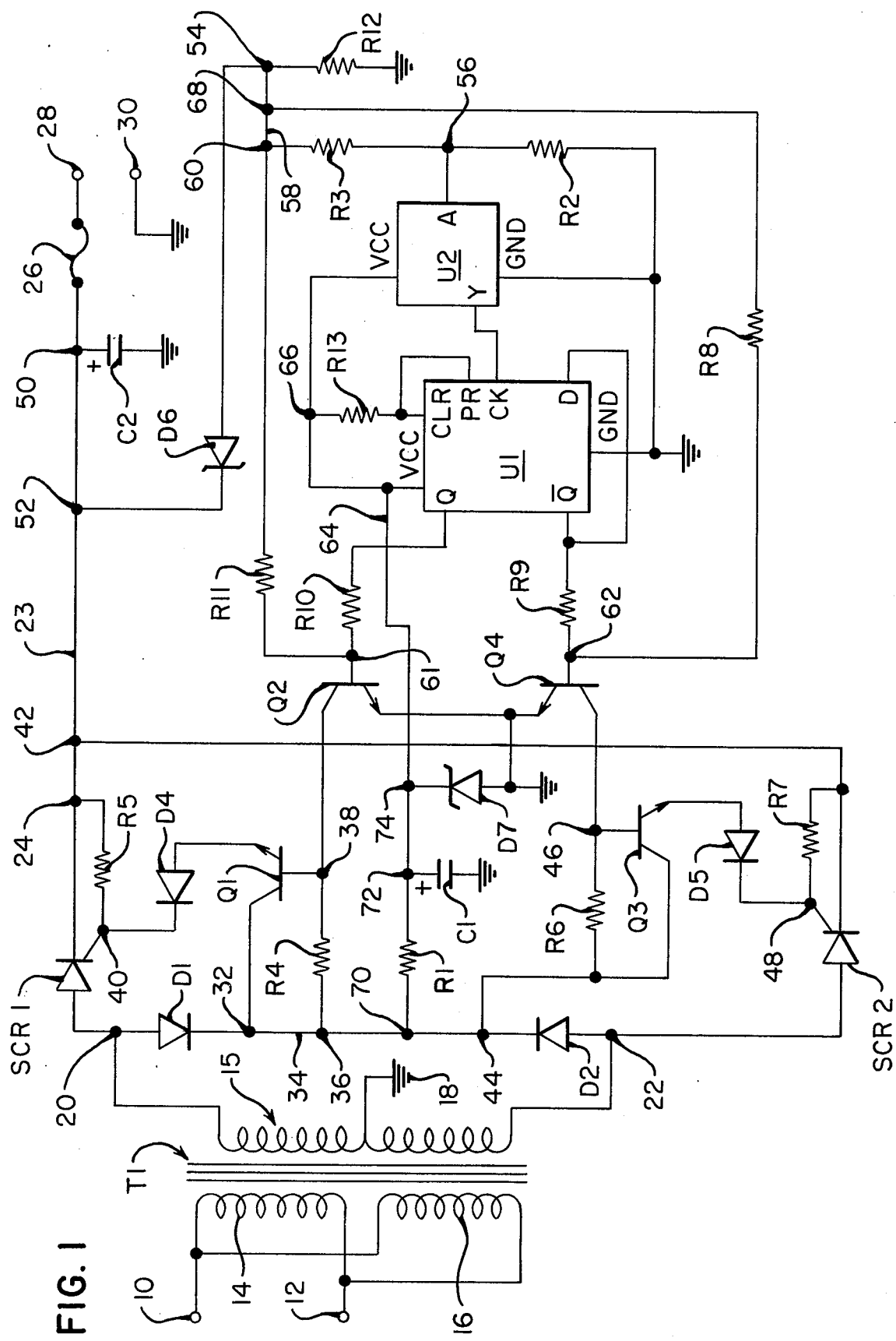
FIG. 1 is a schematic diagram of the circuit of this invention.

In the preferred embodiment, the input means to the circuit shown in FIG. 1 includes a transformer T1 which acts as a step-down transformer to supply a reduced A.C. voltage to the circuit. The transformer T1 includes input terminals 10 and 12 for connection to a source of alternating current potential and the primary windings 14 and 16 which are connected in parallel to the input terminals 10 and 12. The dual input windings 14 and 16 provide flexibility when the circuit is used in foreign countries which utilize a standard input voltage between 220 and 240 volts. The secondary winding 15 of the transformer T1 is center tapped to provide a system ground at 18.

The anode electrode of silicon controlled rectifier SCR 1 (hereinafter called SCR 1) is connected to one end of the secondary winding of transformer T1 at junction 20. The cathode electrode of SCR 1 is connected to the common conductor 23 at junction 24. The common conductor 23 has a fuse 26 in series with it and the first output terminal 28 of the circuit. The second output terminal 30 of the circuit is connected to system ground.

The biasing means for SCR 1 includes diode D1, transistor Q1, resistor R4, diode D4, and resistor R5. The diode D1 functions as a steering diode and has its anode electrode connected to the first end of the secondary winding 15 of transformer T1 at junction 20, and the cathode electrode of diode D1 is connected to the collector electrode of transistor Q1 at junction 32. The resistor R4 has one end connected to the conductor 34 at junction 36, and the remaining end thereof is connected to the base electrode of transistor Q1 at junction 38. The resistor R4 provides the bias to the base electrode of transistor Q1. The emitter electrode of transistor Q1 is connected to the anode electrode of diode D4, and the cathode electrode thereof is connected to the gate electrode of SCR 1 at junction 40. The resistor R5 is connected between the gate electrode of SCR 1 and the cathode electrode thereof as shown.

The biasing means for the silicon controlled rectifier SCR 2 (hereinafter called SCR 2) is similar to that already described in relation to the biasing means of SCR 1. This biasing means includes the diode D2, the resistor R6, the transistor Q3, the diode D5, and the resistor R7. The anode electrode of SCR 2 is connected to the second end of the secondary winding 15 of transformer T1 at junction 22, and the cathode electrode thereof is connected to the conductor 23 at junction 42. The anode electrode of diode D2 is connected to junction 22, and the cathode electrode thereof is connected to the conductor 34 at junction 44. The collector electrode of transistor Q3 and one end of resistor R6 are connected to the conductor 34 at junction 44, and the remaining end of resistor R6 is connected to the base electrode of transistor Q3 at junction 46. The emitter electrode of transistor Q3 is connected to the anode electrode of diode D5, and the cathode electrode thereof is connected to the gate electrode of SCR 2 at junction 48. Resistor R7 is connected between the gate electrode of SCR 2 and the cathode electrode thereof as shown.

The outputs of SCR 1 and 2 supply a rectified current or voltage to the output means of the circuit which includes the storage means C2. The storage means C2 is a capacitor having a very large value which is used as a storage device and not as a filtering device. The storage means or capacitor C2 has its positive electrode connected to conductor 23 at junction 50, and its negative electrode is connected to system ground as shown.

The circuit shown in FIG. 1 also includes a control means for insuring that alternate ones of the silicon controlled rectifiers SCR 1 and SCR 2 will supply rectified voltage to the output of the circuit. The control means includes a voltage sensing means which includes the Zener diode D6 and the resistor R12. The Zener diode D6 has its cathode electrode connected to the conductor 23 at junction 52, and its anode electrode is connected to one end of resistor R12 at junction 54. The remaining end of resistor R12 is connected to system ground. Whenever the rectified voltage supplied by either one of the silicon controlled rectifiers SCR 1 or SCR 2 exceeds the breakover voltage of the Zener diode D6, a control voltage will be developed across resistor R12.

The control means also includes the Schmitt trigger U2, the flip flop means U1, and the control transistors Q2 and Q4 along with their associated coupling components. The Schmitt trigger U2 is conventional such as the SN 7413 Schmitt trigger manufactured by Texas Instruments. The resistors R3 and R2 are series connected together at junction 56 which is also connected to the A input of Schmitt trigger U2 to provide a voltage divider network therefor. The remaining end of resistor R3 is connected to the conductor 58 at junction 60, and the conductor 58 is connected to the anode terminal of diode D6 at junction 54. The remaining end of resistor R2 is connected to system ground. The Y output of Schmitt trigger U2 is fed into the clock or CK input of flip flop U1 which is a conventional "D" flip flop such as SN 7474 which is manufactured by Texas Instruments. The D input to flip flop U is connected to the $\overline{Q}$ output thereof as shown. The PR input and the CLR input of flip flop U1 are connected to each other as shown. The Q output of flip flop U1 is connected to one end of resistor R10 whose remaining end is connected to the base electrode of control transistor Q2 at junction 61. Similarly, the $\overline{Q}$ output of flip flop U1 is connected to one end of resistor R9 whose remaining end is connected to the base electrode of control transistor Q4 at junction 62. The VCC inputs to the Schmitt trigger U2 and the flip flop U1 are connected to a source of positive DC potential via conductor 64. The CLR and the PR inputs of flip flop U1 are supplied with a source of positive potential via resistor R13 which is connected to conductor 64 at junction 66. Both the Schmitt trigger U2 and the flip flop U1 have their ground connections connected to system ground as shown.

The Q and $\overline{Q}$ outputs of flip flop U1 are used to provide the forward bias to the base electrodes of control transistors Q2 and Q4 respectively, which in turn control the operation of the silicon controlled rectifiers SCR 1 and SCR 2, respectively. The collector electrode of control transistor Q2 is connected to the base electrode of transistor Q1 at junction 38. Similarly, the collector electrode of control transistor Q4 is connected to the base electrode of transistor Q3 at junction 46. Both of the emitter electrodes of control transistors Q2 and Q4 are connected to system ground as shown.

The Q and $\overline{Q}$ outputs of flip flop U1 are used to guarantee that alternate ones of the silicon controlled rectifiers SCR 1 and SCR 2 will be brought into conduction to supply a charging current to the capacitor C2 as dictated by the requirements of the load (not shown) which is connected to the output terminals 28 and 30. This feature will be described in detail hereinafter.

Another feature of the control means being described, is that as long as the rectified voltage appearing across the output terminals 28 is above a predetermined level, the silicon controlled rectifiers SCR 1 and SCR 2 will be disabled. This is accomplished by the resistor R11 which is connected between the conductor 58 at junction 60 and the base electrode of transistor Q2, and by the resistor R8 which is connected between the base electrode of control transistor Q4 at junction 62 and the conductor 58 at junction 68. A forward bias is supplied through the resistors R11 and R8 to the bases of control transistors Q2 and Q4 which causes them to conduct, thereby tying the base electrodes of transistors Q1 and Q3 respectively to system ground. This aspect will be described in detail hereinafter.

The VCC voltages for the flip flop U1 and the Schmitt trigger U2 coming over conductor 64 are supplied by the resistor R1, the capacitor C1, and the Zener diode D7. One end of resistor R1 is connected to the conductor 34 at junction 70 and the other end thereof is connected to the conductor 64 at junction 72. The capacitor C1 has its positive electrode connected to junction 72, and the negative electrode thereof is connected to system ground. The cathode electrode of Zener diode D7 is connected to the conductor 64 at junction 74, and the anode electrode thereof is connected to system ground as shown. The resistor R1, the capacitor C1, and the Zener diode D7 conventionally provide rough filtering and regulation of the VCC voltage to the flip flop U1 and the Schmitt trigger U2.

The operation of the circuit shown in FIG. 1 is as follows. Assume initially that the flip flop U1 is in the reset state so that the $\overline{Q}$ output thereof is in a high state, and the Q output thereof is in a low state. Assume also that a positive going current from the secondary winding 15 of transformer T1 is being applied to the anode electrode of SCR 1 and the anode electrode of diode D1. Assume also that the voltage on the cathode electrode of SCR 1 is zero or low. With a positive increasing voltage being applied to the diode D1, the base electrode of transistor Q1 will become forward biased and consequently, this increasing positive voltage will be applied to the gate electrode of SCR 1 through the steering diode D4. As soon as the voltage on the gate electrode of SCR 1 exceeds the voltage on the cathode electrode thereof, SCR 1 will begin to conduct and therefore supply a charging current to the capacitor C2. As the voltage across the capacitor C2 continues to rise due to the charging by SCR 1, a predetermined voltage level at which the Zener diode D6 begins to conduct will be reached and a voltage will be developed across the resistor R12. The voltage which is developed across resistor R12 will cause both of the control transistors Q2 and Q4 to conduct, thereby connecting the bases of transistors Q1 and Q3 to system ground, preventing the silicon controlled rectifiers SCR 1 and SCR 2 from being turned on. As long as the voltage across the capacitor C2 is above the breakover voltage of the diode D6, the silicon controlled rectifiers SCR 1 and SCR 2 will be held in an off condition. However, when the Zener diode D6 begins to conduct, the voltage which is developed across the resistor R12 is utilized also by the resistor divider network consisting of resistors R2 and R3 to trigger the Schmitt trigger U2, thereby producing an output on output terminal Y thereof which output is fed into the flip flop U1 causing it to change state. In continuing with the example earlier given herein, the Q output of flip flop U1 will become high and the $\bar{Q}$ output thereof will become low. A high on the Q output of flip flop U1 keeps the base electrode of transistor Q1 tied to system ground through conduction of transistor Q2; consequently, SCR 1 will not be able to turn on; however, SCR 2 will be conditioned to turn on when the voltage across capacitor C2 drops below the breakover voltage of Zener diode D6. Also, when the voltage across capacitor C2 drops below the breakover voltage of Zener diode D6, the forward biases to the bases of control transistors Q2 and Q4 which are supplied by the resistors R11 and R9, respectively, will be eliminated. Because the base electrode of control transistor Q2 will still be supplied with a high or positive voltage from the Q output of flip flop U1, transistor Q1 will be held in the off condition preventing SCR 1 from being turned on, and the $\bar{Q}$ output of flip flop U1 which is at a low level will prevent the control transistor Q4 from becoming forward biased, therefore, the transistor Q3 will be able to be turned on when the next positive going cycle passes through the diode D2. As soon as the transistor Q3 becomes forward biased, a positive increasing voltage will be applied to the gate electrode of SCR 2, turning it on, to enable it to supply a charging current to the capacitor C2. As soon as the voltage across the capacitor C2 exceeds the breakover voltage of Zener diode D6, a voltage will be developed across the resistor R12 to cause the flip flop U1 to change state as previously described, and this voltage which is developed across the resistor R12 and fed into the bases of control transistors Q2 and Q4 will disable SCR 1 and SCR 2 as previously described.

Through the use of the flip flop U1, one guarantees that neither SCR 1 nor SCR 2 will carry the load for charging capacitor C2 for two successive charging cycles. As a result, the transformer T1 will supply the charging current from alternate halves of its secondary winding which will avoid saturating the transformer and avoid causing its destruction. It should be recalled that in the design of the circuit of this invention, the transformer T1 and SCR 1 and SCR 2 were selected to be the minimum sizes necessary to handle the anticipated loads for the circuit. By guaranteeing that alternate silicon controlled rectifiers SCR 1 and SCR 2 are to be utilized in handling the load, there is no concern that they will become damaged, thereby enabling the production of a low-cost preregulator or power supply circuit. Because the load is balanced between SCR 1 and SCR 2, the heat dissipating problems relative to the rectifiers can be handled more readily with lower-cost, heat sinks.

In a typical full-wave rectifier circuit employing a bridge-type rectifier circuit, an effort is usually made to maintain the voltage at the output of the circuit at some maximum value, which of course, is very dissipative in terms of the rectifiers employed in the circuit. It is also very dissipative in terms of any load that may be connected to the circuit, since the rectifier circuit is always operating at or near its maximum value. This also makes such a circuit very susceptible to line voltage variations. In the circuit of this invention, as long as the line voltage to the transformer T1 is above the minimum output voltage of the circuit, the circuit of this invention will operate; that is, an effort is made in this circuit to simply keep the output voltage above a minimum value and no effort is made to maintain a maximum output voltage of the circuit. The maximum output of the circuit is maintained by the line voltage which is utilized by the transformer T1. The fuse 26 is in the circuit shown in FIG. 1 to protect the transformer T1 and SCR 1 and SCR 2 from excessive load demands which exceed the original design limits of the circuit. Additional fuses (not shown) could be placed in series with each half of the secondary winding 15 of transformer T1 for the same purpose.

The following list is an itemization of the various components used in one embodiment of this invention. Naturally, the various components listed herein could be changed to accommodate a specific design situation within the concepts disclosed herein.

Listing of Components

C1: Filter for +VCC supplied to flip flop U1 and Schmitt trigger U2 (100 ufd at 25V)

C2: Storage capacitor: $C2 \sim (I_L/2f\Delta V) = (20,000 \text{ ufd})$ wherein:

$I_L$ = line current
$f$ = frequency of line current
$\Delta V = V_{max} - V_{min}$ (as later defined herein)
D1 & D2: IN4000 Series Diodes
D4 & D5: IN914 Series Diodes
D6: Zener diode selected for desired average $V_{out}$ − 1.3V or minimum $V_{out}$ + 1 V (10V in embodiment shown.)
D7: Zener diode for VCC for flip flop U1 & Schmitt trigger U2 (4.7V)
Q1, Q2, Q3, & Q4: NPN transistors (2N222 or 2N4400)
SCR 1 & SCR 2: General purpose SCR's with an 8-10 amp rating
T1: Transformer for $V_{out}$ (24 VCT); $V_{max\,out} = V_{RMS} + 1$ V
R1: 220 ohms; used to limit current in Zener diode D5
R2: 500 ohms
R3: 680 ohms
R4, R6, R8; R9, R10, and R11: 10K ohms
R5, R7, R12, and R13: 1K ohms Values Associated With The Waveform Shown in FIG. 2

Figure 2:
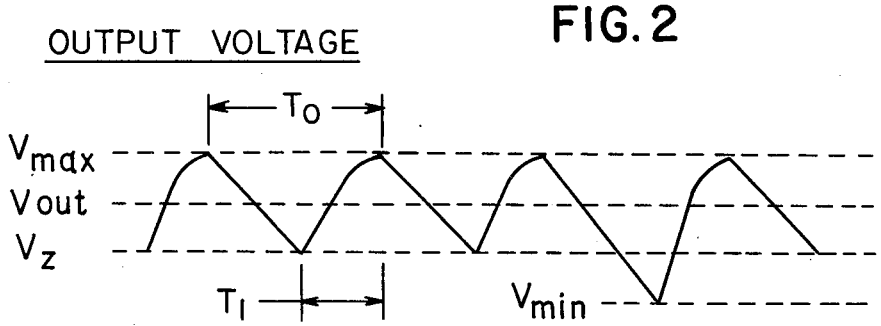
FIG. 2 is a waveform of the output of the circuit shown in FIG. 1.

$V_{max} \sim V_{RMS}$ (of transformer T1) + 1 Volt
$V_Z$ = Breakover voltage of Zener diode D6
$V_{min}$ = Minimum voltage $\sim V_Z - 1$ Volt
$V_{out}$ = Average (RMS) output level
$T_O$ = Time between successive peaks; this varies with the load on output terminals 28 and 30 with $T_{O\,min} = 1/2f_L$; wherein $f_L$ = line frequency $t_1$ = charge time $1/4f_L$ to $1/8f_L$ With regard to the above listing of values associated with the waveform shown in FIG. 2 and the waveform itself shown in FIG. 2, the silicon controlled rectifiers SCR1 and SCR2 are controlled in the following manner. The voltage across the capacitor C2 is sensed by the combination of Zener diode D6, resistor R12, resistor R2, and resistor R3. If the voltage across the capacitor C2 ($V_C$) is less than the breakover voltage of Zener diode D6, little or no voltage appears across the resistor R12. In this situation, the flip-flop U1 controls the control transistors Q2 and Q4. One of these two control transistors Q2 and Q4 will be held "on" and the other transistor will be held "off". For example, if control transistor Q4 is held on by a high level output from the Q output from flip-flop Q1, this transistor will disable the transistor Q3 to which it is connected. When the collector of the transistor Q1 goes positive (as does the base thereof) to an extent that the voltage at the collector is greater than two diode voltage drops (D1 and D4) above the voltage across the capacitor C2, SCR1 will turn on, thereby supplying a charging current to capacitor C2 until the voltage across capacitor C2 exceeds the anode voltage of SCR1, turning it off. This continues until the voltage across capacitor C2 is greater than the breakover voltage of Zener diode D6. When this happens and at least 0.6 to 0.8 V is across the resistor R12, both control transistors Q2 and Q4 will turn "on", thereby stopping all further conduction through the transistors Q1 and Q3 associated with the SCR1 and SCR2 respectively. Because the voltage across the capacitor C2 rises to $V_{RMS}$ plus one volt or so, the voltage across resistor R12 rises to approximately two or more volts. If the voltage which is developed across the resistor R12 rises to the proper level such as 2 to 3 volts, it conditions the voltage divider network consisting of the resistors R3 and R4, and the Schmitt trigger U2 fires, triggering the flip-flop U1 and making it change state. Thus, when the voltage across the capacitor C2 falls to less than the breakover voltage ($V_Z$) again, the opposite silicon controlled rectifier (SCR2) fires; this technique guarantees that SCR1 and SCR2 carry the load equally.

The voltage across the capacitor C2 is carefully held between fixed limits by the very nature of the control for SCR1 and SCR2. By the proper selection of the capacitor C2, Zener diode D6, and the transformer T1, regulation can be assured over a very wide load and line variation. Actual measurement of the circuit shown in FIG. 1 with the capacitor C2 equal to 20,000 ufd, the breakover voltage of Zener diode D6 equal to 10 volts, and the transformer T1 having a 24 volt, center-tapped, secondary winding (VCT) provides 11.3 volts as an average across a 2.5 ohm load connected to the output terminals 28 and 30 of the circuit. With 71 watts being fed into the primary of the transformer T1, with $V_{max}$ equal to approximately 13.2 volts, and with $V_{min}$ equal to 9 volts, the circuit shown in FIG. 1 obtained an efficiency of 72%. Because the load is balanced between the SCR1 and SCR2 in the circuit shown in FIG. 1, a heat sink for each of these rectifiers consisting of a strip of aluminum one-sixteenth inch thick by one-half inch wide by 3 inches long was adequate to cool the rectifiers, enabling them to remain sufficiently cool to touch.

What is claimed is:

1. A circuit comprising:
   input means;
   output means including a storage capacitor;
   first and second rectifier means operatively coupled between said input means and said output means for supplying a rectified voltage to said output means; and
   control means operatively coupled between said output means and said first and second rectifier means for insuring that said first and second rectifier means will alternately supply said rectified voltage to said storage capacitor when a load connected to said output means draws current at a charging frequency of one of said first and second rectifier means.

2. The circuit as claimed in claim 1 in which said first and second rectifier means each have gate means associated therewith, and in which said control means comprises:
   means for sensing said rectified voltage at said output means; and
   switch means operatively coupled to said sensing means and said gate means of said first and second rectifier means whereby each time said rectified voltage falls below a predetermined level, alternate ones of said first and second rectifier means will supply said rectified voltage to said output means.

3. The circuit as claimed in claim 1 in which said first and second rectifier means each have gate means associated therewith and in which said control means comprises:
   means for sensing said rectified voltage at said output means; and
   switch means operatively coupled to said sensing means and said gate means of said first and second rectifier means to disable said first and second rectifier means as long as said rectified voltage is above a predetermined level and to condition said first and second rectifier means whereby each time said rectified voltage falls below said predetermined level, alternate ones of said first and second rectifier means will supply said rectified voltage to said output means.

4. A full wave rectifier circuit comprising:
   input means;
   output means including a storage capacitor;
   first and second rectifier means operatively coupled between said input means and said output means for supplying a rectified voltage to said storage capacitor, with said first and second rectifier means each having a gate means associated therewith; and
   control means operatively coupled between said output means and said first and second rectifier means for insuring that said first and second rectifier means will alternately supply said rectified voltage to said storage capacitor;
   said control means comprising:
   means for sensing said rectified voltage at said output means; and
   switch means operatively coupled to said sensing means and said gate means of said first and second rectifier means whereby each time said rectified voltage falls below a predetermined level, alternate ones of said first and second rectifier means will supply said rectified voltage to said storage capacitor when a load connected to said output means draws current at a charging frequency of one of said first and second rectifier means.

5. A full wave rectifier circuit comprising:
   input means;
   output means including a storage capacitor;
   first and second rectifier means operatively coupled between said input means and said output means for supplying a rectified voltage to said storage capacitor, with said first and second rectifier means each having a gate means associated therewith; and control means operatively coupled between said output means and said first and second rectifier means for insuring that said first and second rectifier means will alternately supply said rectified voltage to said storage capacitor;

said control means comprising:

means for sensing said rectified voltage at said output means; and switch means operatively coupled to said sensing means and said gate means of said first and second rectifier means whereby each time said rectified voltage falls below a predetermined level, alternate ones of said first and second rectifier means will supply said rectified voltage to said storage capacitor;

said switch means comprising a flip-flop means which changes state each time said rectified voltage rises above said predetermined level.

6. The circuit as claimed in claim 5 in which said switch means includes second switch means to disable said first and second rectifier means as long as said rectified voltage is above said predetermined level.

7. The circuit as claimed in claim 6 in which said first and second rectifer means are silicon controlled rectifiers.

8. A full wave rectifier circuit comprising:

a transformer having a centertapped secondary winding having first and second terminals and a centertap connected to system ground of said circuit for providing an alternating potential to said circuit;

an output means including a storage capacitor;

first and second thyristor means being operatively coupled between said first and second terminals respectively and said output means for supplying a rectified voltage to said storage capacitor;

control means operatively coupled between said output means and said first and second thyristor means for insuring that said first and second thyristor means will alternately supply said rectified voltage to said storage capacitor;

said control means comprising:

means for sensing said rectified voltage at said output means;

switch means including a flip-flop means operatively coupled to said sensing means and said first and second thyristor means whereby each time said rectified voltage rises above a predetermined level as a result of one of said first and second thyristor means supplying said rectified voltage to said storage capacitor, said flip-flop means will change state to condition the remaining one of said first and second thyristor means to supply said rectified voltage to said storage capacitor when said rectified voltage at said output means drops below said predetermined level.

9. The full wave rectifier circuit as claimed in claim 8 in which said control means further comprises second switch means operatively connected between said sensing means and said first and second thyristor means for disabling said first and second thyristor means as long as said rectified voltage remains above said predetermined level.

10. A full wave rectifier circuit comprising:

a transformer having a primary winding for connection to a source of alternating potential and a secondary winding with first and second ends and a centertap connected to system ground of said circuit;

first and second output terminals with said second output terminal being connected to said system ground;

first and second silicon controlled rectifiers, each having an anode, a gate and a cathode, and having their anodes connected to said first and second ends, respectively, and their cathodes connected to said first output terminal;

a capacitor connected between said first output terminal and said system ground;

first biasing means operatively coupled between said first end and said gate of said first silicon controlled rectifier and including a first transistor for controlling said first silicon controlled rectifier for supplying a rectified current to said capacitor;

second biasing means operatively coupled between said second end and said gate of said second silicon controlled rectifier and including a second transistor for controlling said second silicon controlled rectifier for supplying a rectified current to said capacitor;

a voltage sensing means coupled to said first output terminal to develop a control voltage when the rectified voltage developed across said capacitor rises above a predetermined level;

flip-flop means having Q and $\overline{Q}$ outputs and an input thereto with said input being operatively coupled to said voltage sensing means and being responsive to said control voltage to switch the states of said Q and $\overline{Q}$ outputs each time said rectified voltage rises above said predetermined level;

first and second control transistor means operatively coupled respectively to said Q and $\overline{Q}$ outputs and said first and second transistors to turn off said first and second silicon controlled rectifiers respectively when said rectified voltage rises above said predetermined level, whereby when said rectified voltage falls below said predetermined level, one of said first and second control transistors will condition the associated said first and second biasing means to thereby cause the associated first or second silicon controlled rectifier to supply said rectified current to said capacitor.

11. The full wave rectifier circuit as claimed in claim 10 in which said flip-flop means includes a flip-flop and a Schmitt trigger means whose input is operatively connected to said voltage sensing means and whose output is connected to the input of said flip-flop.

* * * * *